United States Patent [19]

Miesel

[11] 3,890,343
[45] June 17, 1975

[54] 6-NITRO-2-POLYHALOALKYLBENZIMIDAZOLES
[75] Inventor: John L. Miesel, Indianapolis, Ind.
[73] Assignee: Eli Lilly and Company, Indianapolis, Ind.
[22] Filed: Mar. 20, 1974
[21] Appl. No.: 453,135

Related U.S. Application Data
[63] Continuation-in-part of Ser. No. 221,808, Jan. 28, 1972, abandoned.

[52] U.S. Cl. ............... 260/309.2; 71/92; 260/349; 260/578; 260/581; 260/621; 260/622 R; 260/624 R; 260/626; 260/645; 260/646; 424/273
[51] Int. Cl. ........................... C07d 49/38
[58] Field of Search ............................ 260/309.2

[56]  References Cited
FOREIGN PATENTS OR APPLICATIONS
1,122,988  11/1964  United Kingdom ............ 260/309.2
1,426,887  12/1965  France ........................... 260/309.2
   90,296  10/1967  France ........................... 260/309.2

Primary Examiner—Natalie Trousof
Attorney, Agent, or Firm—Kathleen R. S. Page; Everet F. Smith

[57] ABSTRACT

4-Aliphatic-substituted-6-nitro-2-($\alpha,\alpha$-difluoroalkyl)benzimidazole compounds and their alkali metal and alkaline earth metal salts, useful as insecticides and as herbicides.

7 Claims, No Drawings

6-NITRO-2-POLYHALOALKYLBENZIMIDAZOLES

CROSS-REFERENCE TO RELATED APPLICATION

This is a continuation-in-part of my copending application Ser. No. 221,808, filed January 28, 1972, now abandoned.

SUMMARY OF THE INVENTION

The present invention is directed to compounds of the formula

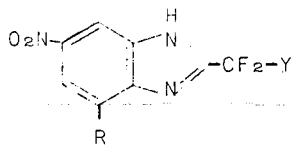

wherein Y represents
a. hydrogen,
b. chlorine,
c. fluorine,
d. difluoromethyl,
e. trifluoromethyl, or
f. pentafluoroethyl;
and R represents
1. branched alkyl of $C_3$–$C_6$, both inclusive,
2. cycloalkyl of $C_3$–$C_6$, both inclusive,
3. cycloalkylloweralkyl, wherein cycloalkyl is of $C_3$–$C_6$, both inclusive, and loweralkyl is of $C_1$–$C_2$, both inclusive, or
4. methylcycloalkyl, wherein cycloalkyl is as defined in the preceding candidate moiety; and the alkali metal and alkaline earth metal salts thereof.

The above-described compounds exhibit insecticidal activity; hence, the present invention is also directed to insecticidal methods employing, and compositions comprising, the above-described compounds.

DETAILED DESCRIPTION OF THE INVENTION

Formulae employed throughout the present specification are predicated on the assumption that the proton on the imidazole portion of the benzimidazole ring is affixed at a ring position arbitrarily designated as "1":

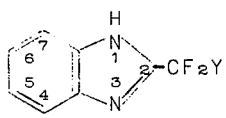

However, this proton may not be fixably attached to a specific ring nitrogen atom. Rather, it is believed that the compounds typically exist as tautomers, e.g.:

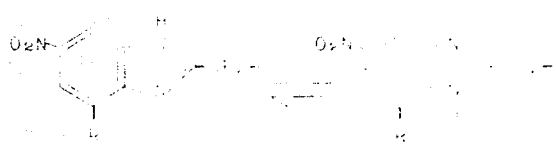

Therefore, the formulae herein, while showing the proton fixably positioned for the sake of uniform representation, are employed to designate either of the tautomeric forms or the more typical tautomeric mixture.

"Branched alkyl" refers to any alkyl group of the specified carbon atom content ($C_3$–$C_6$) in which not all of the carbon atoms are in a straight chain. Thus, the term includes isopropyl, isobutyl, sec-butyl, tert-butyl, isopentyl, tertpentyl, isohexyl, and 1,2-dimethylbutyl.

The compounds of the present invention are typically crystalline solids. They are prepared by reacting an o-phenylenediamine of the formula

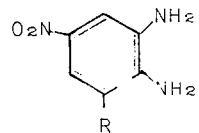

with an acid of the formula $$Y—CF_2—COOH,$$

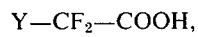

conveniently in an inert liquid as reaction medium. The reaction proceeds readily at temperatures ranging from room temperature to 150°C. or higher, but is preferably and conveniently conducted at reflux temperatures. Some of the desired product is obtained when employing the reactants in any amount; but higher yields of product are obtained by employing equimolecular amounts or an excess of the acid, such as a one-to-ten- or-more fold excess. Water is produced as by-product.

In carrying out the reaction, the o-phenylenediamine compound and acid are contacted with one another in any manner. Most conveniently, the acid is added to a solution of the o-phenylenediamine, and the resulting solution is heated to reflux. While some of the desired product is produced almost immediately upon the contacting of the reactants, higher yields are obtained when the reaction mixture is held for a period of time in the reaction temperature range. The product is readily separated from the reaction mixture, and purified if desired, by means of conventional procedures.

The following examples illustrate the synthesis of the compounds of the present invention and will enable those skilled in the art to practice the present invention.

EXAMPLE 1

4-tert-BUTYL-6-NITRO-2-(TRIFLUOROMETHYL)-BENZIMIDAZOLE

To a solution of the HCl salt from 8.2 grams of 2-tert-butyl-4-nitro-o-phenylenediamine (about 0.04 moles) in 300 milliliters of 6N HCl was added 60 ml. of trifluoroacetic acid. The solution was refluxed overnight, then poured into water. The desired 4-tert-butyl-6-nitro-2-(trifluoromethyl)-benzimidazole precipitated. It was separated, chromatographed on magnesium silicate (Florisil, 100–200 mesh) and recrystallized from an aliphatic naphtha (Skellysolve B) to which a little benzene had been added. The purified product melted at 159°–9.5°C. The identity of the product was confirmed by NMR.

EXAMPLES 2–5

Other representative products of the present invention, prepared according to the foregoing teachings and example, are set forth in the following table.

TABLE I

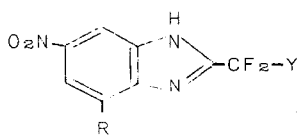

| R | Y | Characterizing Property |
|---|---|---|
| isopropyl | F | m.p., 188–89.5°C. |
| sec-butyl | F | m.p., 110–12°C. |
| sec-butyl | $CF_3$ | m.p., 108–10°C. |
| cyclohexyl | $CF_3$ | m.p., 149.5–52°C. |

EXAMPLES 6–18

Yet other representative compounds of the present invention likewise prepared according to the foregoing teachings and examples, are the following:

4-(1,2-dimethylbutyl)-6-nitro-2-(pentafluoroethyl)-benzimidazole 4-sec-butyl-6-nitro-2-(heptafluoropropyl)benzimidazole 4-cyclopropyl-6-nitro-2-(trifluoromethyl)benzimidazole 4-cyclopentyl-6-nitro-2-(difluorochloromethyl)benzimidazole 4-cyclohexyl-6-nitro-2-(difluoromethyl)benzimidazole 4-(1-cyclopentylethyl)-6-nitro-2-(difluoromethyl)benzimidazole 4-(cyclohexylmethyl)-6-nitro-2-(difluorochloromethyl)benzimidazole 4-(cyclobutylmethyl)-6-nitro-2-(trifluoromethyl)benzimidazole 4-(1-methylcyclohexyl)-6-nitro-2-(trifluoromethyl)-benzimidazole 4-tert-butyl-6-nitro-2-(trifluoromethyl)benzimidazole, sodium salt 4-sec-butyl-6-nitro-2-(pentafluoroethyl)benzimidazole, calcium salt 4-sec-butyl-6-nitro-2-(1,1,2,2-tetrafluoroethyl)benzimidazole 4-isopropyl-6-nitro-2-(1,1,2,2-tetrafluoroethyl)benzimidazole The compounds of the present invention are useful for the control of insect and arachnid pests and can be used for the control of those insect and arachnid pests found on the roots or aerial portion of plants. These compounds are active, for example, against such arachnids as red spider mite, citrus mite, two-spotted spider mite, Pacific mite, clover mite, fowl mite, various species of ticks, and various species of spiders, The compounds are also active against such insects as Mexican bean beetle, boll weevil, corn rootworm, cereal leaf beetle, flea beetles, borers, Colorado potato beetle, grain beetles, alfalfa weevil, carpet beetle, confused flour beetle, powder post beetle, wireworms, rice weevil, rose beetle, plum curculio, white grubs, melon aphid, rose aphid, white fly, grain aphid, corn leaf aphid, pea aphid, mealybugs, scales, leafhoppers, citrus aphid, spotted alfalfa aphid, green peach aphid, bean aphid, milkweed bug, tarnished plant bug, box elder bug, bed bug, squash bug, chinch bug, house fly, yellow fever mosquito, stable fly, horn fly, cabbage maggot, carrot rust fly, Southern armyworm, codling moth, cutworm, clothes moth, Indianmeal moth, leafrollers, corn earworm, European corn borer, cabbage looper, cotton bollworm, bagworm, sod webworm, fall armyworm, German cockroach, and American cockroach.

The methods of the present invention comprise contacting an insect or arachnid with an inactivating amount of one of the compounds of the present invention. Contacting can be effected by application of one or more of the products to a habitat of the insect or arachnid. Representative habitats include soil, air, water, food, vegetation, inert objects, stored matter such as grains, other animal organisms, and the like. The inactivation can be lethal, immediately, or with delay, or can be a sub-lethal one in which the inactivated insect or arachnid is rendered incapable of carrying out one or more of its normal life processes. Among known insecticides, this latter situation typically prevails when one of the systems of the organism, often the nervous system, is seriously disturbed; however, the precise mechanism by which the compounds constituting the present active agent work is not yet known, and the insecticidal and arachnicidal method of the present invention is not limited by any mode of operation.

The utilization of an inactivating amount of one of the compounds of the present invention is critical to the insecticidal and arachnicidal method of the present invention. The inactivating amount can sometimes be administered by employing the compound in unmodified form. However, for good results, it is generally necessary that the compound or compounds be employed in modified form, that is, as one component of a composition formulated to implement the archnicidal and insecticidal effects. Thus, for example, the active agent can be mixed with water or other liquid or liquids, preferably aided by the usage of a surface active agent. The active agent can also be incorporated on a finely divided solid, which can be a surface active substance, to yield a wettable powder, which can subsequently be dispersed in water or other liquid, or incorporated as part of a dust which can be applied directly. Other methods of formulation are known in the art and can be employed in implementing the present invention.

The exact concentration of one or more of the compounds of the present invention in a composition thereof with one or a plurality of adjuvants can vary; it is necessary only that one or more of the products be present in such amount as to make possible the application of an inactivating dosage to an insect or arachnid. In many situations, a composition comprising 0.00001 percent of the present active agent is effective for the administration of an inactivating amount thereof to insect and arachnid pest organisms. Compositions having a higher concentration of active agent, such as a concentration of from 0.00001 to 0.5 percent, can of course be employed. In still other operations, compositions containing from 0.5 to 98 percent by weight of one compound or from 0.5 to 98 percent of a total of more than one compound, are conveniently employed. Such compositions are adapted to be employed as treating compositions and applied to insects and arachnids and to their habitats, or to be employed as concentrates and subsequently diluted with additional adjuvant to produce ultimate treating compositions.

Liquid compositions containing the desired amount of active agent are prepared by dissolving the substance in an organic liquid or by dispersing the substance in water with or without the aid of a suitable surface active dispersing agent such as an ionic or non-ionic emulsifying agent. Such compositions can also contain modifying substances which serve as a "spreader" and "sticker" on plant foliage. Suitable organic liquid carriers include the agricultural spray oils and the petroleum distillates such as diesel fuel, kerosene, fuel oil naphthas and Stoddard solvent. Among such liquids the petroleum distillates are generally preferred. The aqueous compositions can contain one or more water immiscible solvents for the toxicant compound. In such compositions, the carrier comprises an aqueous emulsion, e.g., a mixture of water, emulsifying agent and water immiscible solvent. The choice of dispersing and emulsifying agent and the amount thereof employed is dictated by the nature of the composition and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyalkylene derivatives or sorbitan esters, complex ether alcohols, and the like. For a review of known surface-active agents which are suitably employed in implementing the present invention, attention is directed to U.S. Pat. No. 3,095,299, second column, lines 25–36, and references there cited.

In the preparation of dust compositions, the active ingredient is intimately dispersed in and on a finely divided solid such as clay, talc, chalk, gypsum, limestone, vermiculite fines, perlite, and the like. In one method of achieving such dispersion, the finely divided carrier is mechanically mixed or ground with the active agent.

Similarly, dust compositions containing the toxicant compounds can be prepared with various of the solid surface active dispersing agents such as bentonite, fuller's earth, attapulgite and other clays. Depending upon the proportions of ingredients, these dust compositions can be employed as concentrates and subsequently diluted with additional solid surface active dispersing agents or with chalk, talc, or gypsum and the like to obtain the desired amount of active ingredient in a composition adapted to be employed for the practices of the present invention. Also, such dust compositions can be dispersed in water, with or without the aid of a dispersing agent, to form spray mixtures.

Also, the compounds of the present invention can be employed in granular formulations. These formulations are prepared in conventional manner, typically by dissolving the compound in a solvent with or without a surface-active agent and spraying or otherwise distributing the resulting solution onto pre-formed granules. Such granular formulations are capable of providing longer-lasting activity and may be preferred for crops such as corn where repeated application is not practical.

When operating in accordance with the present invention one or more of the compounds or a composition containing one or more of the compounds is applied to the pests to be controlled directly or by means of application to a portion or portions of their habitat in any convenient manner, for example, by means of hand dusters or sprayers or by simple mixing with the food to be ingested by the organisms. Application to the foliage of plants is conveniently carried out with power dusters, boom sprayers, and fog sprayers. In such foliar applications, the employed compositions should not contain any appreciable amounts of any phytotoxic diluents. In largescale operations, dusts, or low-volume sprays can be applied from an airplane. The present invention also comprehends the employment of compositions comprising one or more of the compounds of the present invention, an adjuvant, and one or more biologically active materials, such as other insecticides, fungicides, miticides, bactericides, nematocides, and the like.

EXAMPLE 19

Compounds evaluated for the control of insects and arachnids, as reported in the following examples, were formulated in accordance with the following procedure. Initially, 55 grams of a mixture of two nonionic sulfonate emulsifiers were mixed with 1 liter of cyclohexanone. Of the resulting mixture, 0.9 milliliter was subsequently further mixed with 90 milligrams of the subject compound and diluted with distilled water to 90 milliliters, containing the subject compound at a concentration of 1,000 parts per million. For evaluation at lower concentrations, the mixture was further diluted with a dilution composition consisting of 4 liters of distilled water and a total of 1.8 milliliter of the same two nonionic sulfonate emulsifiers.

The insecticidal and arachnicidal activity of the compounds of this invention is illustrated by the following tests against representative insects and arachnids.

Test Methods

Mexican Bean Beetle — *Epilachna varivestis* (Coleoptera)

Cuttings of four-to-six-day-old Bountiful snap bean plants containing two leaves with approximately 5 square inches of leaf surface each were placed in water. The leaves were sprayed to wetting with about 5–10 ml. of a formulation containing a predetermined level of the test compound. Half of the formulation was sprayed on the top surface and half on the bottom surface of the leaf using a DeVilbiss atomizer at 10 psi held at a distance of about 18 inches from the leaf. After the leaves had dried, they were cut from the stem and placed separately in petri dishes. Ten third instar, non-molting Mexican bean beetle larvae grown on Bountiful snap beans were placed on each leaf. Controls consisted of two leaves sprayed with 5 ml. of a 500 ppm. formulation of S-(1,2-dicarbethoxyethyl) O,O-dimethyl phosphorodithioate (reference standard), two leaves sprayed with the formulation without the active ingredient and two leaves held as untreated controls. After 48 hours, a mortality count was made and the amount of feeding noted. Moribund larvae were counted as dead. The following toxicity rating scale was used:

| Percent Dead | Rating |
| --- | --- |
| 0–10 | 0 |
| 11–20 | 1 |
| 21–30 | 2 |
| 31–40 | 3 |
| 41–50 | 4 |
| 51–60 | 5 |
| 61–70 | 6 |
| 71–80 | 7 |
| 81–90 | 8 |
| 91–100 | 9 |

Southern Armyworm — *Prodenia eridania*
(Lepidoptera)

Ten uniform Southern armyworm larvae about 1–1.5 cm. in length, grown on Henderson lima beans, were placed on excized bean leaves in petri dishes. The bean leaves were obtained and sprayed with the insecticide in the same way as were the snap bean leaves in the Mexican bean beetle test. The reference standards in this instance were leaves sprayed with 5 ml. of 100 ppm. DDT solution. Mortality counts were made 48 hours after spraying and again moribund larvae were counted as dead. Missing larvae which had probably been eaten were considered alive. The same rating scale was used as in the Mexican bean beetle test.

Two-Spotted Spider Mite — *Tetranychus urticae*
(Acarina)

Two-spotted spider mites were raised on green bean plants, then transferred to squash plants. The squash plants were maintained for 2 days so that the infestation was well established. The infected squash plants were then sprayed with a test formulation containing the subject compound as in the preceding test methods. Mortality was determined by estimation 48 hours after spraying. The same rating scale was used as in other test procedures.

House Fly — *Musca domestica* (Diptera)

Rearing cages containing four-day-old adult house flies were chilled at 35°–40°F. for about 1 hour. One hundred flies were transferred from the rearing cage to each test cage using a small scoop. The caged flies were kept for 1–2 hours at 70°–80°F. The cages were sprayed each with 5 ml. of a test formulation containing one of the compounds in specified concentration. Two unsprayed cages were held as controls and two cages were sprayed with a 50 ppm. DDT formulation as a reference standard. Mortality counts were made 24 hours after spraying. All flies that did not fly or did not walk up from the bottom of the cage were considered moribund. The same rating scale was employed as heretofore.

Boll Weevil — *Anthonomus grandis* (Coleoptera)

The procedure was identical to that employed for the Mexican bean beetle and the Southern armyworm, except that 10 adult boll weevils were placed on cotton leaves that had been dipped into formulations of the test compounds. The same rating scale was used.

Test Results

EXAMPLES 20–23:

EVALUATION OF COMPOUNDS AGAINST MEXICAN BEAN BEETLE

Various compounds of the present invention were evaluated in accordance with the test method described above against Mexican Bean Beetle. The compounds so evaluated, the rates employed, and the results of the evaluations are as set forth in the following table. When more than one evaluation was carried out at a given rate, the result reported for that rate is an average of the several results.

TABLE II

| Compound | Rate in Parts Per Million | Toxicity Rating Against Mexican Bean Beetle |
|---|---|---|
| 4-tert-butyl-6-nitro-2-trifluoromethyl-benzimidazole | 1000 | 9.0 |
|  | 500 | 9.0 |
|  | 250 | 9.0 |
|  | 100 | 9.0 |
| 4-isopropyl-6-nitro-2-trifluoromethyl-benzimidazole | 1000 | 9.0 |
|  | 500 | 8.5 |
|  | 250 | 6.0 |
|  | 100 | 7.5 |
| 4-sec-butyl-6-nitro-2-pentafluoroethyl-benzimidazole | 1000 | 9.0 |
|  | 500 | 7.0 |
|  | 250 | 7.0 |
| 4-sec-butyl-6-nitro-2-trifluoromethyl-benzimidazole | 1000 | 9.0 |
|  | 500 | 8.5 |
|  | 250 | 8.0 |

EXAMPLES 24–28:

EVALUATION OF COMPOUNDS AGAINST SOUTHERN ARMYWORM

Various compounds of the present invention were evaluated in accordance with the test method described above against Southern armyworm. The compounds so evaluated, the rates employed, and the results of the evaluation are as set forth in the following table. Where more than one evaluation was carried out at a given rate, the result reported for that rate in an average of the several results.

TABLE III

| Compound | Rate in Parts Per Million | Toxicity Rating Against Southern Armyworm |
|---|---|---|
| 4-tert-butyl-6-nitro-2-trifluoromethyl-benzimidazole | 1000 | 9.0 |
|  | 500 | 9.0 |
|  | 250 | 9.0 |
|  | 100 | 7.0 |
| 4-isopropyl-6-nitro-2-trifluoromethyl-benzimidazole | 1000 | 8.5 |
|  | 500 | 8.0 |
|  | 250 | 9.0 |
| 4-sec-butyl-6-nitro-2-pentafluoroethyl-benzimidazole | 1000 | 9.0 |
|  | 500 | 9.0 |
|  | 250 | 9.0 |
|  | 100 | 9.0 |
| 4-cyclohexyl-6-nitro-2-pentafluoroethyl-benzimidazole | 1000 | 8.5 |
|  | 500 | 9.0 |
|  | 250 | 8.0 |
| 4-sec-butyl-6-nitro-2-trifluoromethyl-benzimidazole | 1000 | 9.0 |
|  | 500 | 9.0 |
|  | 250 | 9.0 |

EXAMPLES 29–33:

EVALUATION OF COMPOUNDS AGAINST TWO-SPOTTED SPIDER MITE

Various compounds of the present invention were evaluated in accordance with the test method described above against two-spotted spider mite. The compounds so evaluated, the rates employed, and the results of the evaluation are as set forth in the following table.

TABLE IV

| Compound | Rate in Parts Per Million | Toxicity Rating Against Two Spotted Spider Mite |
|---|---|---|
| 4-tert-butyl-6-nitro-2-trifluoromethyl- | 1000 | 9.0 |
|  | 500 | 9.0 |

TABLE IV-Continued

| Compound | Rate in Parts Per Million | Toxicity Rating Against Two Spotted Spider Mite |
|---|---|---|
| benzimidazole | 250 | 9.0 |
|  | 100 | 7.5 |
|  | 50 | 7.0 |
| 4-isopropyl-6-nitro- 2-trifluoromethyl- benzimidazole | 1000 | 9.0 |
|  | 500 | 7.5 |
|  | 250 | 7.0 |
|  | 100 | 9.0 |
| 4-sec-butyl-6-nitro- 2-pentafluoroethyl- benzimidazole | 1000 | 9.0 |
|  | 500 | 9.0 |
|  | 250 | 9.0 |
|  | 100 | 9.0 |
|  | 50 | 8.5 |
|  | 25 | 6.5 |
| 4-cyclohexyl-6-nitro- 2-pentafluoroethyl- benzimidazole | 1000 | 9.0 |
|  | 500 | 9.0 |
|  | 250 | 6.0 |
| 4-sec-butyl-6-nitro- 2-trifluoromethyl- benzimidazole | 1000 | 9.0 |
|  | 500 | 9.0 |
|  | 250 | 9.0 |
|  | 100 | 6.0 |

EXAMPLES 34–37:

EVALUATION OF COMPOUNDS AGAINST HOUSE FLY

Various compounds of the present invention were evaluated in accordance with the test method described above against house fly. The compounds so evaluated, the rates employed, and the results of the evaluations are as set forth in the following table. Where more than one evaluation was carried out, the result reported for that rate is an average of the several results.

TABLE VI

| Compound | Rate in Parts Per Million | Toxicity Rating Against House Fly |
|---|---|---|
| 4-tert-butyl-6-nitro- 2-trifluoromethyl- benzimidazole | 1000 | 9.0 |
|  | 500 | 9.0 |
|  | 250 | 9.0 |
|  | 100 | 9.0 |
|  | 50 | 9.0 |
|  | 25 | 9.0 |
|  | 10 | 9.0 |
| 4-sec-butyl-6-nitro- 2-pentafluoroethyl- benzimidazole | 1000 | 8.5 |
|  | 500 | 9.0 |
|  | 250 | 8.5 |
| 4-cyclohexyl-6-nitro- 2-pentafluoroethyl- benzimidazole | 1000 | 8.5 |
|  | 500 | 9.0 |
|  | 250 | 9.0 |
| 4-sec-butyl-6-nitro- 2-trifluoromethyl- benzimidazole | 1000 | 9.0 |
|  | 500 | 9.0 |
|  | 250 | 9.0 |
|  | 100 | 9.0 |
|  | 50 | 9.0 |

In addition to insecticidal activity, the compounds of the present invention exhibit some limited herbicidal activity. Thus, in employing the compounds as insecticides for the control of insects which attack plants, due regard should be paid to the selection of rates, the growth stage of plants, the susceptibility of the plants to the compounds, and the like. When it is desired to utilize the herbicidal activity of the compounds, the compounds can be employed to control plant growth generally, or to selectively control weeds growing in crop plants. The compounds exhibit herbicidal activity at rates of from one-half lb. or less to 10 lbs. or more. Compounds preferred for their herbicidal activity are those wherein R represents branched alkyl, especially branched alkyl of $C_3$ to $C_4$.

When employed as herbicides, the compounds are conveniently formulated with adjuvants. Reference is made to the discussion hereinabove regarding the formulation of the compounds incident to utilization as insecticides. The compounds can be applied pre-emergent or post-emergent, in accordance with conventional modes of application.

Representative compounds were evaluated for herbicidal activity. Uniformly the evaluation was conducted by dispersing the respective compound with suitable surface-active agents in an aqueous solution and spraying the solution onto plots seeded with various species. A control plot was sprayed with an aqueous solution containing only the surface-active agents, in the same concentration. The plots were held under good growing conditions for twelve to thirteen days.

When evaluated by this method at a rate of 8 pounds/acre, 4-tert-butyl-6-nitro-2-trifluoromethylbenzimidazole gave essentially complete control of crabgrass, pigweed, foxtail, and velvetleaf, without any phytotoxic effect on corn, cotton, or soybeans. 4-Isopropyl-6-nitro-2-trifluoromethylbenzimidazole at 8 pounds/acre likewise gave essentially complete control of the same named weed species, but exhibited minor phytotoxicity to corn and moderate phytotoxicity to soybeans. The compound exhibited no phytotoxicity to cotton, however. Results essentially the same as these latter results were also observed with 4-sec-butyl-6-nitro-2-trifluoromethylbenzimidazole at 8 pounds/acre, and with 4-sec-butyl-6-nitro-2-pentafluoroethylbenzimidazole at 8 pounds/acre.

Preferred compounds are those of the formula

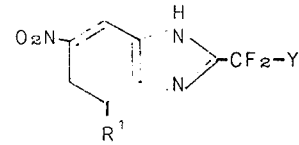

wherein Y is as defined hereinabove and wherein $R^1$ represents branched alkyl of $C_3$–$C_4$ or cyclohexyl. A particular preferred Y group is fluorine.

The phenylenediamines to be employed as starting materials in accordance with the present invention:

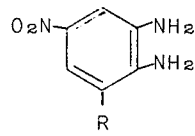

are themselves prepared in known procedures, by either of two synthetic routes. An o-R-phenol is employed as the initial starting compound:

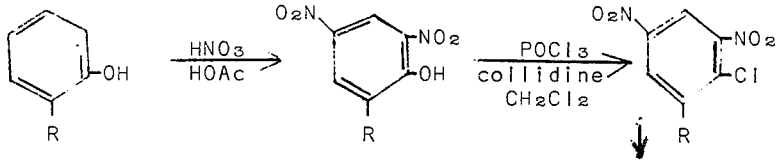

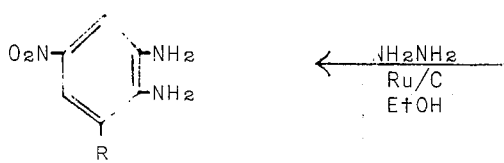
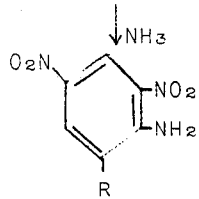

In a second synthetic procedure, the chloro intermediate is prepared as above but subsequently treated differently:

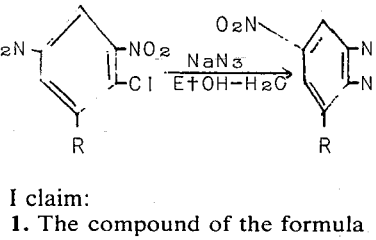

I claim:
1. The compound of the formula

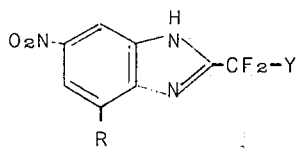

wherein Y represents
a. hydrogen,
b. chlorine,
c. fluorine,
d. difluoromethyl,
e. trifluoromethyl, or
f. pentafluoroethyl;
and R represents 1. Branched alkyl of $C_3$–$C_6$, both inclusive,
2. cycloalkyl of $C_3$–$C_6$, both inclusive,
3. cycloalkylloweralkyl, wherein cycloalkyl is of $C_3$–$C_6$, both inclusive, and loweralkyl is of $C_1$–$C_2$, both inclusive, or
4. methylcycloalkyl, wherein cycloalkyl is as defined in the preceding candidate moiety; or an alkali metal or alkaline earth metal salt thereof.

2. The compound of claim 1 wherein R represents branched alkyl of $C_3$–$C_4$ or cyclohexyl.

3. The compound of claim 2 which is 4-tert-butyl-6-nitro-2-trifluoromethylbenzimidazole.

4. The compound of claim 2 which is 4-isopropyl-6-nitro-2-trifluoromethylbenzimidazole.

5. The compound of claim 2 which is 4-sec-butyl-6-nitro-2-pentafluoroethylbenzimidazole.

6. The compound of claim 2 which is 4-cyclohexyl-6-nitro-2-pentafluoroethylbenzimidazole.

7. The compound of claim 2 which is 4-sec-butyl-6-nitro-2-trifluoromethylbenzimidazole.

* * * * *